Aug. 26, 1969    C. G. REEKS ET AL    3,462,883
MEANS FOR AUTOMATICALLY OPERATING AND
CONTROLLING RECIPROCATING MOTION
Filed Jan. 10, 1966    3 Sheets-Sheet 1

INVENTORS
CHRISTOPHER GEORGE REEKS ET AL

BY Norris + Bateman

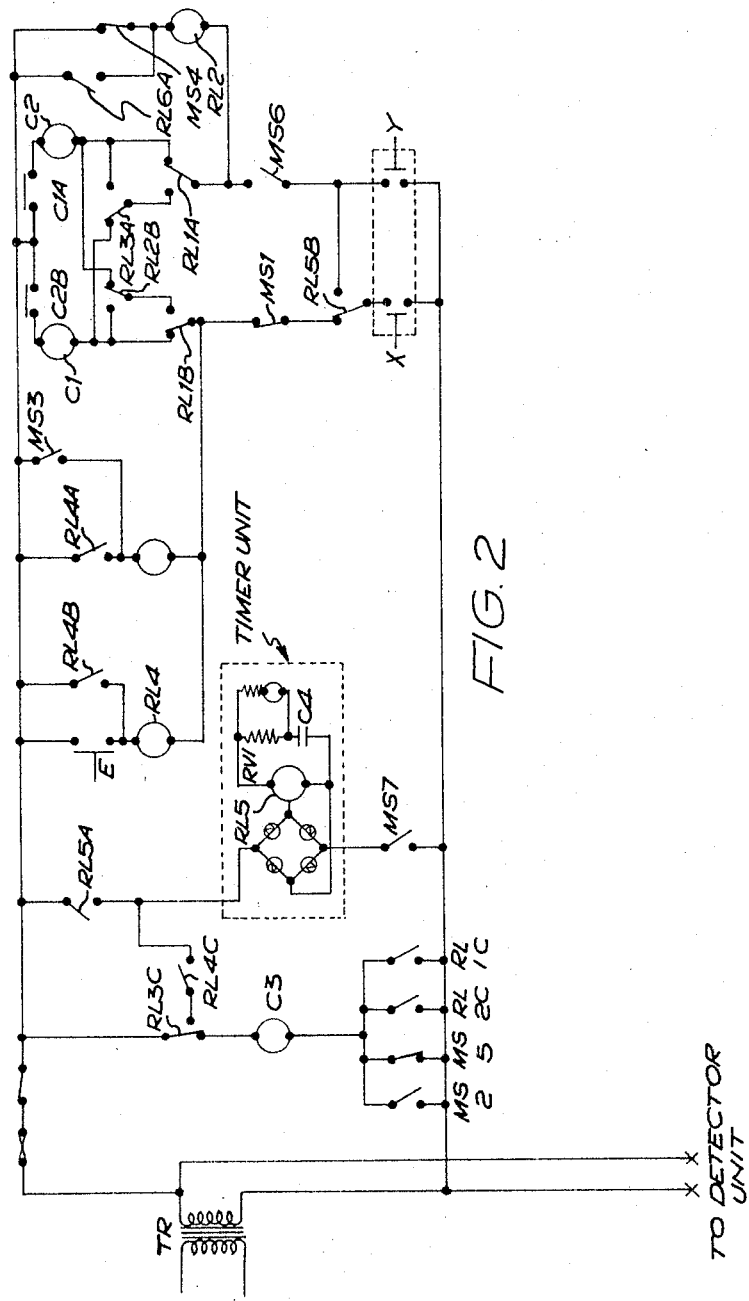

United States Patent Office 3,462,883
Patented Aug. 26, 1969

3,462,883
MEANS FOR AUTOMATICALLY OPERATING AND CONTROLLING RECIPROCATING MOTION
Christopher George Reeks, Barrow-upon-Soar, and Anthony Walter Davey, Long Whatton, England, assignors to Herbert Morris Limited, Loughborough, Leicester County, England, a company of Great Britain
Filed Jan. 10, 1966, Ser. No. 519,675
Claims priority, application Great Britain, Jan. 14, 1965, 1,762/65
Int. Cl. E05f *11/54, 15/14;* B66b *13/14*
U.S. Cl. 49—360                                6 Claims

ABSTRACT OF THE DISCLOSURE

A sliding door or like member is mounted for reciprocation on a stationary support. A linear induction motor has relatively movable motor members mounted on the support and reciprocable member. The motor control circuit includes a plurality of switches on the support located to be sequentially actuated by the reciprocable member moving in either direction for effecting variable deceleration of said reciprocable member. Speed sensing means produces an electrical signal responsive to movement of the reciprocable member in either direction, and the signal is connected into the circuit for modifying the deceleration control.

---

This invention relates to means for automatically operating and controlling the speed and terminal stopping positions of an object which requires to be reciprocated between predetermined positions and in particular to sliding doors for lifts.

It has been proposed to automatically operate the sliding doors of lifts or similar apparatus by an A.C. or D.C. electric motor, driving through belts, gears, levers, and chains with a friction brake or clutch; air, oil or spring check device and drum switch to effect the required speed, travel and terminal stopping position without impact. This equipment requires a considerable degree of skill in alignment and adjustment; and frequent attention and readjustment to maintain accurate operation in service.

According to the invention apparatus for operating a reciprocating member comprises one member of a linear induction motor mounted on the reciprocating member and the other member mounted on a stationary framework switches being provided on the stationary framework engaged by switch operating devices on the reciprocating member as it moves in each direction.

The invention will be described with reference to the accompanying drawings illustrating a linear motor applied to a lift door:

FIG. 2 is a circuit diagram of a controller for automatically operating the linear induction motor.

One member B of a linear induction motor is mounted on a reciprocating member A and the other member B1 is mounted longitudinally on the track travelled by the reciprocating member A.

Figure 1:
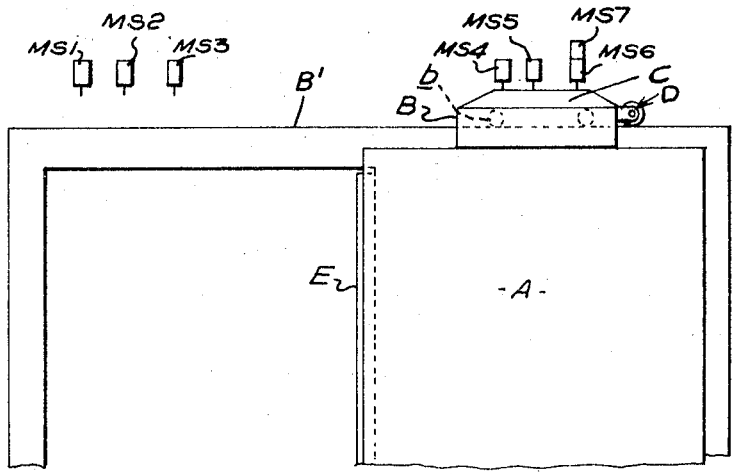
FIG. 1 is a diagrammatic elevation of a lift sliding door in the open position with one member of a linear motor mounted thereon.

As applied to the sliding door A of an elevator as shown in FIG. 1 the coil member B of the linear motor is mounted thereon on rollers *b* engaging a track formed of a metal plate B1 attached to the roof of the elevator car and extending the length of travel to be covered by the door and motor and forming the stationary member thereof, an air gap being provided between the moving and stationary members of the motor.

Two series of switches MS1, MS2, MS3 and MS4, MS5, MS6, MS7 are adjustably positioned along the path travelled by the door A actuated by a ramp or cam C mounted on the motor coil member B. A speed sensing device comprising a tachogenerator D is affixed to the motor coil member B driven by a rubber tired wheel engaging the track B1 to produce a voltage proportioned to the linear speed of the door.

A door safety edge contact E is fitted to the side of the door A, the function of which is to stop and reopen the doors should it be obstructed during closing. Alternatively a light ray beamed across the entrance to a photoelectric sensitive receiver may be provided, the interruption of the light ray operates to stop and reopen the door A.

Figure 3:
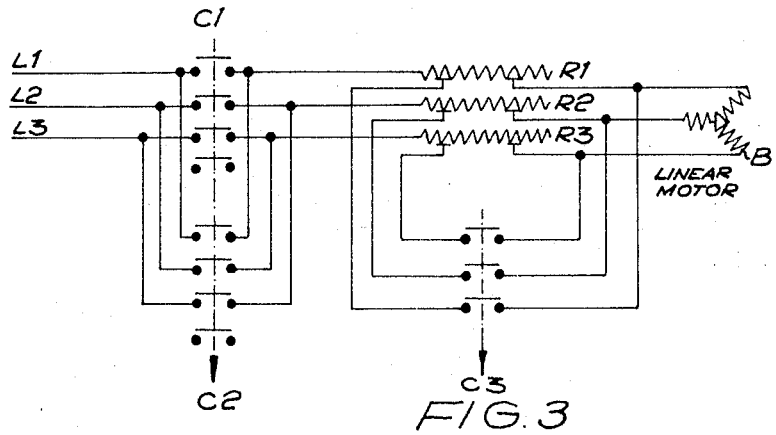
FIG. 3 is a diagram of a three-phase circuit of a motor power unit.

The linear motor B is supplied with three phase A.C. through adjustable resistances R1, R2 and R3 preset to control the maximum and minimum thrust for movement of the door A when a contactor C3 is energized. Further contactors C1, C2 control the reversing connections to the linear motor B for opening or closing the door A (FIG. 3).

The motor B is operated by a controller as shown in FIG. 2 and a second controller (FIG. 4) automatically operates in conjunction with the motor controller from voltage fed from the tachogenerator D.

The tachogenerator D feeds a bridge rectifier MRI–6 whose output energizes a transistor TR1.

When transistor TR1 is conducting, the voltage between its collector and emitter is very low, considerably less than the Zener voltage of a Zener diode MR8 such that transistor TR2 is cut off by the positive voltage applied to its base bia resistor R9 and hence the relay RL3 is unenergized.

When the door is closing and the ramp or cam C is about to operate the switch MS3, the transistor TR1 is conducting due to the output from the tachogenerator D. The emitter of the transistor TR2 is not connected and relay RL3 is unenergized.

When the switch MS3 is operated contact RL1B will close connecting the emitter of the transistor TR2. The relay RL3 will not operate however until the door has decelerated to a speed set by a resistor RV3 after which the transistor TR1 will cease to conduct.

The voltage across the transistor TR1 will rise and as soon as this voltage exceeds the Zener voltage of a Zener diode MR8, base drive current will flow in transistor TR2 causing it to conduct, thus energizing the relay RL3 to operate a contact RL3D which holds until the door closure is completed and relay RL1 is deenergized. The contact RL1B is thus opened and the circuit reverts to its deactivated condition.

When the door is opening the circuit functions as before but is activated by contact RL2B.

The maximum opening speed is limited by relay RL6 which initiates reverse braking when the voltage from the tachogenerator D via resistance RV2 exceeds the Zener voltage of a Zener diode MR9. The base drive current which then flows in transistor TR3 causes it to conduct thereby energizing relay RL6.

A charged capacitor C5 is connected across the coil of relay RL6 to damp out relay chatter.

The network resistors R4, R5 and Zener diode MR7 prevent excessive base current in transistor TR1 when the tachogenerator is delivering full voltage, by limiting the voltage across Zener diode MR7 to the Zener voltage.

Diodes MR10 and MR11 prevent damage to transistors TR2 and TR3 caused by voltage transients induced in the relay coils when the relays RL3 and RL6 are de-energized.

Power supplies for the circuit are obtained from the A.C. mains supply ($x$—$x$) through a rectifier bridge MR14–17, ballast resistor RII, and Zener voltage regulator MR13. The bias supply is obtained from the forward voltage drop of rectifier MR12. Capacitor C7 protects the rectifier bridge MR14–17 from voltage surges.

The control of the operations for closing the door A when in the open position is as follows:

A door close contact X on a lift control panel is operated in known manner. The contactor C1 is energized by the closing of the contact X to feed a 3-phase supply to the motor B through the resistances R1, R2, R3, which are adjusted for the desired maximum thrust. The motor B starts to close the door A. Ramp or cam C first disengages the switch MS6 (door open limit switch) and switch MS7 (timer switch).

The switch MS5 is next disengaged to de-energize the contactor C3 and insert a section of the adjustable resistances into the linear motor B circuit to reduce its thrust to a value for the door A to continue closing at the predetermined low speed.

The switch MS4 is next disengaged but this switch is not in circuit during the door closing operation.

On approaching the end of the door closing travel the switch MS3 is engaged to energise a relay RL1. The relay RL1 diverts a contact RL1A (FIG. 2) to de-energize the contactor C1 and energize the contactor C2 thus reversing the current in the motor B and decelerating the motor.

Simultaneously a contact RL1C closes contactor C3 to short circuit the center section of the resistances R1, R2, R3, and increase the thrust of the motor B to quickly decelerate the door closing speed.

Also simultaneously the contact RL1B closes to activate a detector unit (FIG. 4) and energize a relay RL3 when the voltage output from the generator D falls below a preset value.

The switch MS2 is engaged by movement of the door A, but this switch is not in circuit having been short circuited by the closing of the contact RL1C.

A relay contact RL3C changes over to de-energize the contactor C3 and reinsert the center section of the resistances R1, R2, R3 into the motor B circuit to reduce the reverse thrust.

Simultaneously a relay contact R13A diverts the energizing feed from the contactor C2 to the contactor C1 and the door completes its closing movement at slow speed.

The switch MS1 is egaged to de-energize the contactor C1 and thereby the motor B and a relay RL1. This relay RL1 in turn de-energizes a relay RL3 and leaves the door A in the closed position.

The door operating system is now available for a "door open" signal from the lift control panel Y. The sequence of operations to open the door is similar to that for closing but the switch MS6 in place of MS1, MS2 for MS5, MS4 for MS3 and relay RL2 for relay RL1.

The door closing operation above described presupposes an unimpeded movement of the door A but if the door meets an obstruction causing the safety edge contact E to make circuit or the interruption of a light ray beamed across the opening to a photoelectric cell the following sequence of operations will occur to stop the door from closing quickly at any position in its travel and cause it to reopen. The door safety edge contact energies a relay RL4 and retains by a contact RL4B.

Simultaneously a relay contact RL4A short circuits the switch MS3 (reverse brake closing) to energize the relay RL1; divert contact RL1A causing contactor C2 to switch to "door open" and the normal sequence of door opening occurs as follows:

A relay contact RL4B maintains the door safety edge contact E.

The contact RL1A diverts energizing current from the contactor C1 to contactor C2 and reverses the motor thrust.

Figure 4:
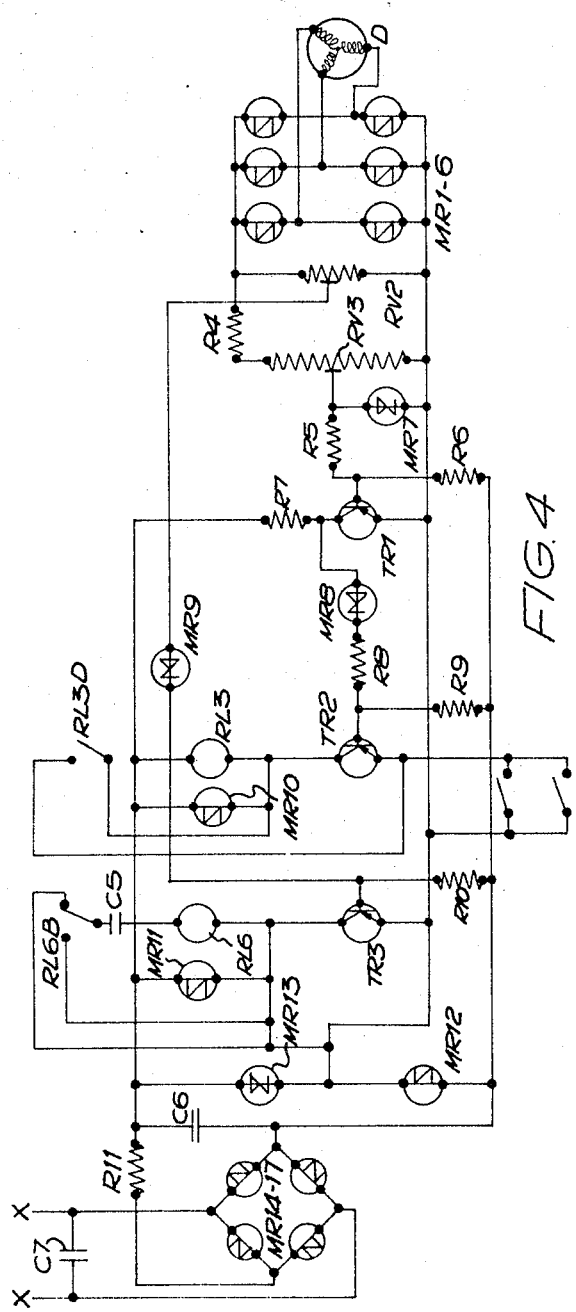
FIG. 4 is a circuit diagram for a controller for automatically operating in conjunction with the controller of FIG. 2.

The contact RL1B activates the detector unit FIG. 4. The contact RL1C energizes the contactor C3 to short cut the centre sections of the resistances R1, R2, R3, to switch the motor to high thrust open.

When the door reaches minimum set speed the detector energizes the relay RL3. In this case, however, the contact RL3C energizes a relay RL5 through the contact RL4C.

The "door close" signal is now diverted to the "door open" circuit by the contact RL5B and the door will open, decelerating normally due to switch MS4 and stopping due to the switch MS6.

The contact RL5B is thus maintained by the relay RL5 through the contact RL5A.

Simultaneously with the operation of the switch MS6 the switch MS7 is actuated to cut off the energizing current for the relay RL5.

The relay RL5 however will be maintained by the charge on a capacitor C4 in the timer unit for the adjustable predetermined time set by a resistance RV1 (FIG. 2).

When the capacitor C4 is discharged the relay RL5 is de-energized to open the contacts RL5A. The contact RL5B diverts back and a door closing sequence recommences as above described.

If an attempt is made to accelerate the door by pushing it manually, the tachogenerator D (FIG. 4) will increase in speed to energize the relay RL6. This relay will close the contacts RL6A to short circuit the switch MS4 and initiate the deceleration procedure (reverse braking).

The embodiments of the invention in which an exclusive property or privilege is claimed are defined as follows.

We claim:

1. Apparatus for controlling operation of a reciprocable member mounted for reciprocation on a stationary support comprising a linear induction motor having an operable connection to a source of alternating current and having coacting relatively movable motor members mounted on said support and said reciprocable member, a motor control circuit including a plurality of switches on said support located to be sequentially actuated by a device carried by said reciprocable member when said reciprocable member is moving in either direction for effecting variable deceleration of said reciprocable member, speed sensing means producing an electrical signal responsive to movement of said reciprocable member in either direction and means connecting said signal into said circuit for modifying said deceleration control.

2. In the apparatus defined in claim 1, said circuit comprising variable resistance means interposed between the motor and said source, and means controlled by said switches for selectively varying said resistance means to vary the speed of said reciprocable member.

3. In the apparatus defined in claim 1, said circuit comprising means operated by certain of said switches when said reciprocable member is moving in a given direction for reversing the motor current to decelerate movement of said reciprocable member in that direction and then again reversing the motor current after the reciprocable member has moved a predetermined distance after such deceleration for effecting a predetermined continued movement in that direction.

4. In the apparatus defined in claim 3, means in the circuit actuated by one of said switches in the period between said current reversals for reducing the power supplied by said source to said motor.

5. In the apparatus defined in claim 4, said means to reduce the power supplied to said motor comprising means for decreasing a variable resistance in the motor input from said source.

6. In the apparatus defined in claim 1, said speed sensing means being connected to said circuit by the sequential closing of one of said switches, and means in said circuit comparing a voltage signal generated by said speed sensing means which is proportional to the linear speed of said reciprocating member with a reference voltage in said circuit.

References Cited

UNITED STATES PATENTS

| 1,881,015 | 10/1932 | Ayers | 49—360 |
| 1,986,639 | 1/1935 | Konn | 49—360 X |
| 2,303,263 | 11/1942 | Fisher | 49—360 X |

DAVID J. WILLIAMOWSKY, Primary Examiner

J. KARL BELL, Assistant Examiner

U.S. Cl. X.R.

49—138, 358; 187—52, 56; 310—12, 19; 318—22, 135